Dec. 17, 1940.   W. E. VAN DORN ET AL   2,225,242
SUSPENSION SYSTEM FOR VEHICLES
Filed March 7, 1938   6 Sheets-Sheet 1
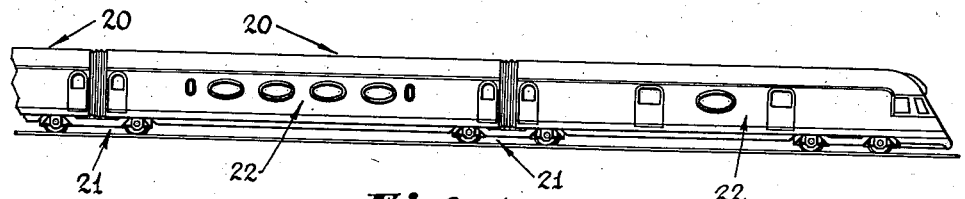
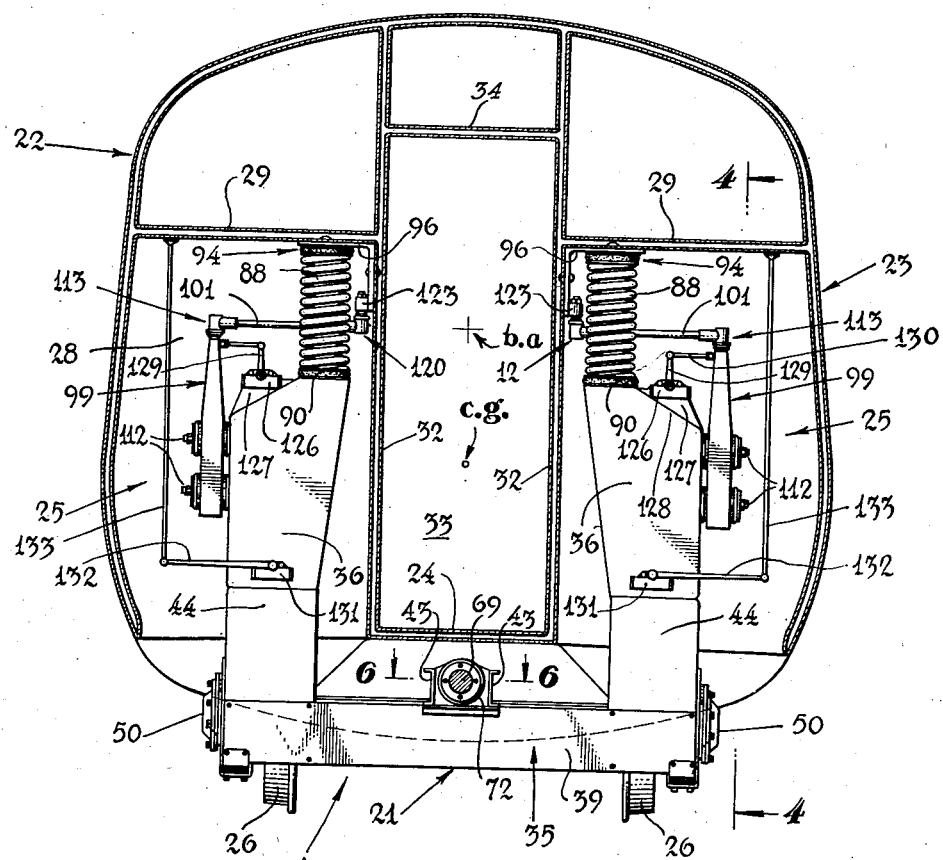
William E. Van Dorn and
Paul K. Beemer,
INVENTORS
BY
ATTORNEY Dec. 17, 1940.     W. E. VAN DORN ET AL     2,225,242
SUSPENSION SYSTEM FOR VEHICLES
Filed March 7, 1938     6 Sheets-Sheet 2

William E. Van Dorn and
Paul K. Beemer,
INVENTORS

BY
ATTORNEY

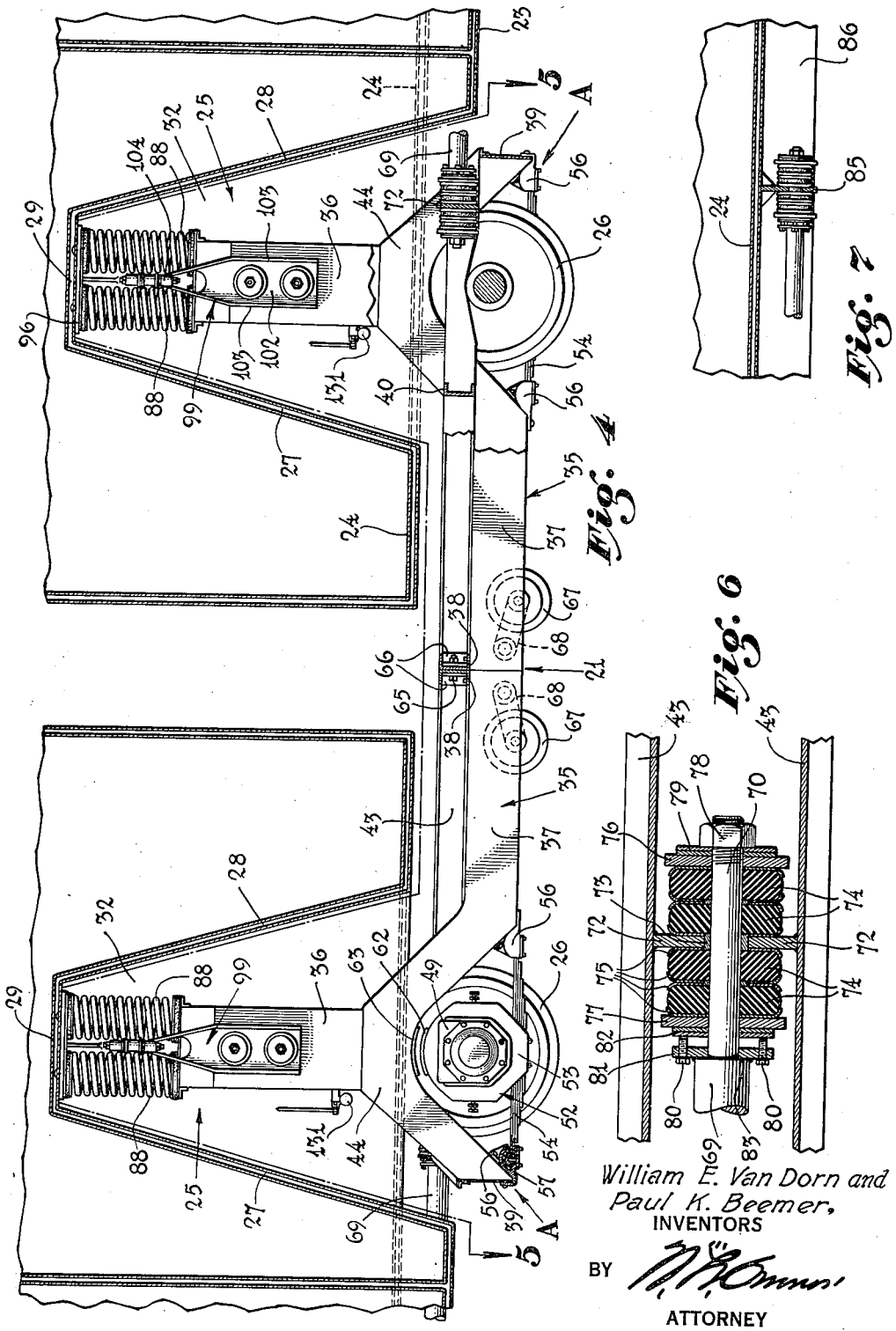

Dec. 17, 1940. W. E. VAN DORN ET AL 2,225,242
SUSPENSION SYSTEM FOR VEHICLES
Filed March 7, 1938 6 Sheets-Sheet 4
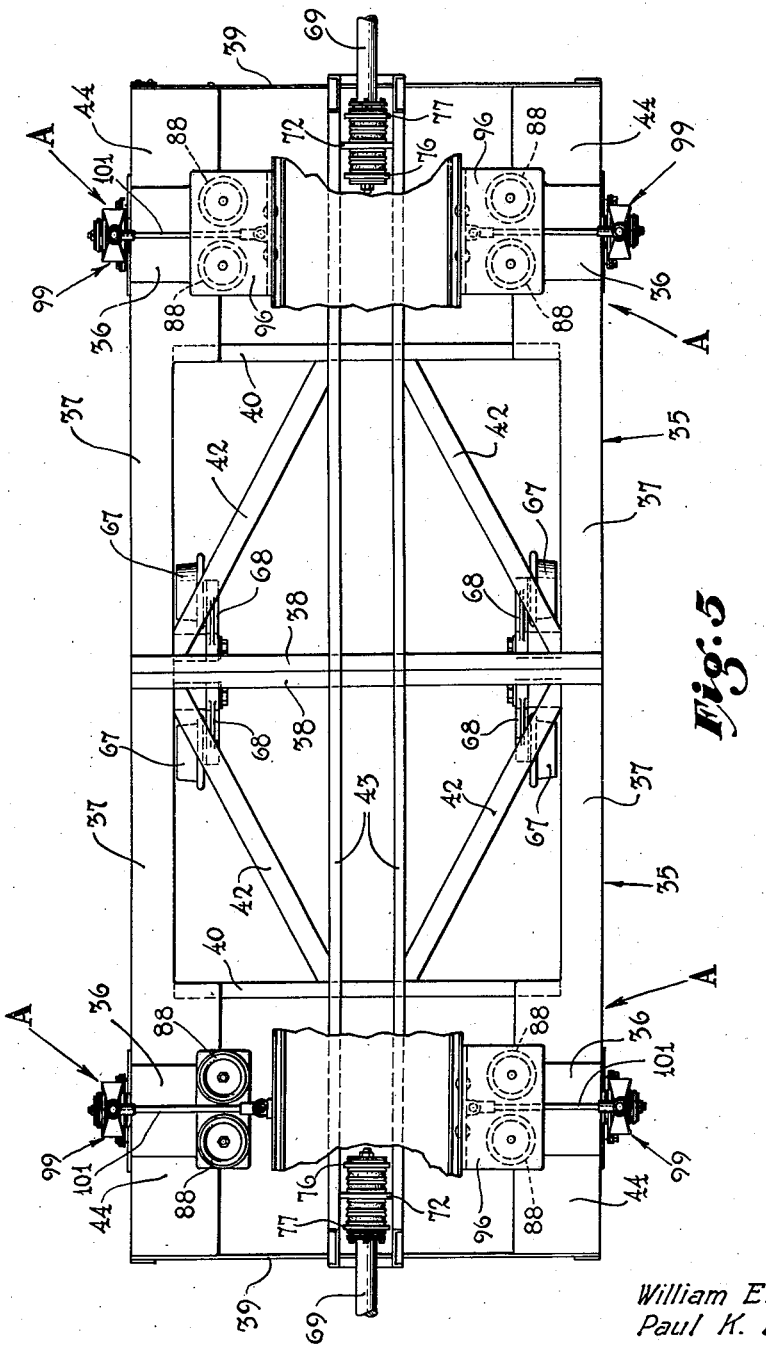
William E. Van Dorn and
Paul K. Beemer,
INVENTORS
BY 
ATTORNEY Dec. 17, 1940. W. E. VAN DORN ET AL 2,225,242
SUSPENSION SYSTEM FOR VEHICLES
Filed March 7, 1938 6 Sheets-Sheet 5
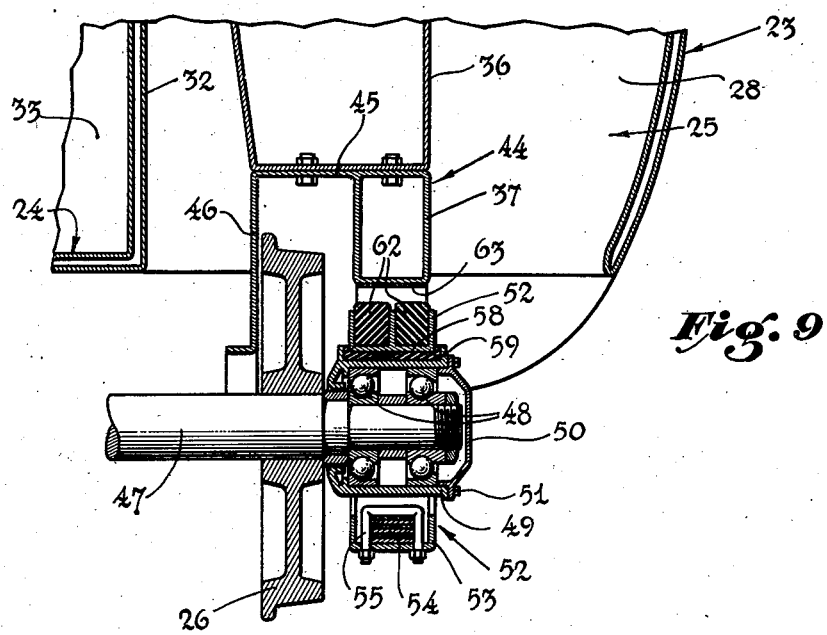
*Fig. 9*
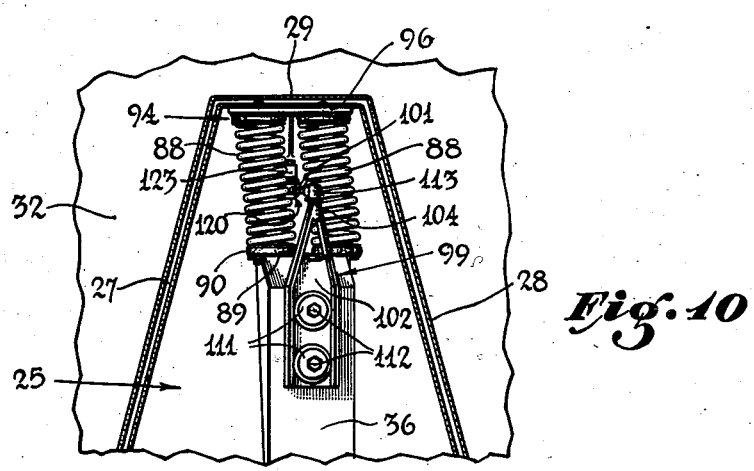
*Fig. 10*
William E. Van Dorn and
Paul K. Beemer,
INVENTORS
BY 
ATTORNEY Patented Dec. 17, 1940

2,225,242

UNITED STATES PATENT OFFICE 2,225,242

SUSPENSION SYSTEM FOR VEHICLES

William E. Van Dorn, Pasadena, and Paul K. Beemer, Inglewood, Calif., assignors, by mesne assignments, to Pacific Railway Equipment Company, Los Angeles, Calif., a corporation of California Application March 7, 1938, Serial No. 194,260

32 Claims. (Cl. 105—199)

This invention relates to vehicles, more particularly to means for mounting vehicle bodies on wheels, and is directed to a construction especially applicable to light-weight, high-speed trains.

The subject-matter of the present application is a specific embodiment of the broad principles set forth in an application entited "Suspension system for vehicles," filed October 5, 1935, Serial Number 43,692, and subsequent continuation applications Ser. No. 303,231, filed November 7, 1939, and Ser. No. 303,232, filed November 7, 1939.

The common object of this group of applications is to provide an inherently stable vehicle of minimum weight offering maximum safety and comfort in high-speed transit. Each of the disclosures of the group, including the present application, represents the same general approach to the problems involved and is based on the same general theory. For a full discussion of the factors to be considered and of the principles underlying the basic solutions, reference is made to the prior disclosures. It may be stated briefly here that the problem of stability becomes increasingly acute with the reduction of weight and the increase of speed characteristic of modern trends in railway operation, and that maximum inherent stability is the predominant consideration in each of these disclosures.

The solution for the problem of stability contemplated in this group of inventions involves the suspension of a relatively low car body from a wheel unit, with the support points at or above the center of gravity of the car body to achieve inherent stability for the body, and the further provision of suitable flexibility in the connection between the wheel unit and the car body to absorb shock, avoid strain, and permit banking of the body on curves.

In the construction of a passenger car having a relatively low floor, the necessity of extending the floor over the wheel unit of the car eliminates the possibility of employing the usual bogie truck pivoting about a central, vertical axis, because such a truck requires too much clearance between the floor of the car and the track below. This group of applications, therefore, has the further common object of providing suitable means for connecting a wheel unit to a car body at points spaced to each side of the car aisle in a flexible manner to permit the required relative rotation of the wheel unit. The term "wheel unit" is used generically here to mean either a truck having a plurality of pairs of wheels or an axle unit having only a single pair of wheels.

In this combination of a wheel unit and a car body suspended from points at or above its center of gravity, the character of the flexibility provided by the interconnection between the wheel unit and the body is one of the most important factors that determine the inherent stability of the combination and is to be stressed as a primary consideration in the present inventive concept. While it is preferable in our construction to suspend the car body from points at or above its center of gravity, it is to be understood that this is not absolutely necessary to successful operation, as the points of support may be located below the center of gravity. The lateral restraints and controls hereinafter described, as well as the high level suspension, tend to fix an oscillation axis above the center of gravity, and these controls and the suspension may be arranged either one, or preferably, both at a high level above the center of gravity. It will be understood that in referring to center of gravity of the car body we mean the substantial or effective center of gravity of the body with whatever load it may be carrying or designed to carry.

Freedom for relative movement of the car and the wheel unit out of normal alignment permits the wheel unit to negotiate curves and to accommodate itself readily to track variations; such freedom on the part of the car body, in addition to reducing shock, permits the body to yield in a natural manner and with smooth transitions to the changing resultant of forces during normal transit. This latter function is of prime importance in avoiding strain and in increasing the comfort of passengers, especially in the negotiation of curves. But the freedom for relative movement between the car body and the supporting wheel unit must be limited to suitable safe boundaries, and, furthermore, a certain degree of restraint on the turning movements of the wheel unit of a car has been found highly desirable. An object, then, is, within the permissible range of movement, to combine freedom of movement with an inherent tendency for maintenance of normal alignment between the body and the supporting wheel units.

The prior disclosures identified above rely largely on body-supporting links to provide the required character of flexibility in the interconnection between the body and the wheel unit. In such a linkage construction, the extent of relative movement is safely limited by the range of various links involved. The body-supporting linkage mounting has been found to be eminently satisfactory and considerably in advance of the prior art. But the movements of the car body must be translated into link movements that unavoidably affect the character of the response.

A primary feature of the present invention is its provision of flexibility of a new character in the relationship between the car body and the supporting wheel unit. And the invention provides, through a new type of elastic flexure, an even greater freedom of relative movement within the permissible range than heretofore obtained, and accompanies this new type and degree of freedom with an inherent tendency for the body and wheel unit to seek normal alinement with one another.

The invention attains these features by floating a car body, preferably relatively low, on a universally resiliently yielding element or combination of elements forming a unit, which element or unit of elements so support the body that it swings about a longitudinal center of oscillation above its center of gravity. In the specific and illustrative form hereinafter described these universally yielding elastic elements are preferably paired and, acting as a unit, support the body at opposite sides of a central aisle and at points of support at or above the center of gravity. The car body swings as a pendulum for both slight oscillations and for banking on curves. These same universally yielding elastic supporting units provide, within themselves and by their elastic flexure, for all the necessary freedoms and relative movements between the car body and wheel unit, including vertical, lateral and longitudinal movements, and the relative swivelling movements of the wheel unit, as well as the oscillative banking movements about the longitudinal oscillation center.

While we contemplate permitting universal relative movement between the car body and its supporting wheel unit, in the preferred form of our invention described herein we do not contemplate providing universally equal resistance to such movement. On the contrary, a feature of our invention is the conception that the various yielding elements involved in the mounting arrangement may have different, effective moduli of elasticity or spring rates selected to favor a desired character of flexibility in the mounting. Thus, the suspended body may be given relatively great freedom to move vertically, as well as to rotate or to tilt about a horizontal axis or to approximate such rotation when yielding to centrifugal force on curves, and may be given somewhat less but substantial lateral freedom to absorb fleeting lateral forces of transit, but limited freedom for longitudinal movement of the car body relative to its wheel unit. In fact, it is within the scope of our conception to virtually eliminate simple longitudinal relative movement, without destroying the freedom of the car body to move in any manner in all other directions.

In a particular construction chosen for illustrative purposes, the car body is supported on the wheel unit through the medium of laterally spaced elastic columns (coiled springs) whose upper ends support the body at points above its center of gravity. As a result of this suspension the car body oscillates, when banking for instance, as a pendulum about a longitudinal axis located between the points of elastic support and above the center of gravity.

Swivelling movements of the wheel unit relative to the car body are accommodated by torsional deflection of the elastic supporting unit—torsional with respect to a central vertical axis of the wheel unit; while banking or other rotative oscillation is accompanied by elastic vertical compression of the resilient columns at one side of the axis and extension at the other. Lateral motions of the car body are accommodated by transverse bending of the columns.

The elastic load-bearing columns resist and absorb vertical forces acting between the axle unit and car body, the smaller, more fleeting forces being dissipated, and the larger and more enduring forces being accommodated by smooth transitions of the car body.

Relative horizontal freedoms, both transverse and longitudinal, are accommodated by corresponding flexures of these same elastic supporting units.

As a further feature and part of the invention, a yielding restraint to lateral freedom relative to the wheel unit is imposed on the car body, and while this function may be and is in part performed by the load bearing elastic elements, there is preferably employed for this purpose separate laterally acting elastic elements effective between the wheel units and car body. In normal straight-ahead travel, these laterally acting elastic elements hold the car body centrally on the load-bearing elastic columns, and, at the same time, act as a cushioning means for fleeting, laterally directed forces between the wheel units and car body.

In the preferred construction, and as a further feature of the invention, the laterally acting elastic elements exert their restraining and restoring forces on the car body along a transverse line located above the center of gravity and at or near the desired center of body oscillation. Applying the restriction at that level has the effect, additive to or independently of the similar effect of the location of the level of suspension, of restrictively locating the center of oscillation as desired above the center of gravity.

Furthermore, and as a further although not fundamental feature of the invention, these laterally acting restraining elements are preferably in pairs and act on the car body at points spaced at opposite sides of the vertical axis, and exert forces opposite to each other. For instance they apply opposite forces, through pivoted links, to the car body at opposite sides of the central aisle. By virtue of this arrangement, the tension of the laterally acting restraining elements is increased either by banking of the car body (rotation on the longitudinal axis) or by rotative swivelling displacement of the wheel unit relative to the car body on curves. Thus these laterally acting restraining elements to some extent oppose and control banking action, tending at all times to restore the car body to its normal level position, and also to some extent present a desirable degree of yielding restraint and restoration to swivelling movements of the wheel units out of normal alinement with the car body. Swivelling movements of the wheel unit relative to the car body are thus yieldingly opposed by the elastic restraint of both the load bearing elastic columns and the laterally acting elastic elements. This yielding restraint and restorative action is of a progressively increasing character, and provides the required tendency for the body and wheel units to maintain normal alinement, thereby encouraging the wheel unit to track straight ahead.

The laterally acting controls have also the desirable function of tending to constrain swivelling action of the wheel unit to the vertical swivelling axis which passes substantially through the transverse line along which they act.

Also, while the function of restricting longitudinal movement between car body and wheel units is largely delegated to other members, the described lateral control links serve to fulfil a part of that function.

The described elastic supporting elements permit a certain relative longitudinal movement between wheel unit and car body. This is reduced to a relatively small amount by a draft connection at a relatively low level between the wheel unit and car body. In combination with supporting springs which may be located and connect with the car body at a relatively high level, it is an important feature of the invention that the draft connection be located as nearly as may be practicable at the lower level of the longitudinal reaction forces that result from acceleration and deceleration. The draft connection with the wheel unit is also preferably at or near the vertical swivelling axis of the wheel unit. In such position it tends desirably to assist in localizing that axis. This draft connection, however, preferably incorporates a resilient yielding element, which, while not permitting much longitudinal movement between car body and wheel unit, yet avoids rigidity in the draft members. The restrained character of the yielding action in the draft connection does not conflict with the required universal freedom of the car body at the support points.

A feature of the suspension provided by the invention is the achievement of freedom for universal movement of the car body away from its normal disposition with minimum inherent directional restraint on the part of the mechanical interconnection between the body and wheel unit, except for that expressly provided by making the elastic restraints in certain directions greater than in others, as heretofore mentioned.

In addition to the inventive features that have been broadly and briefly outlined, there are others in detail which will be apparent from the following description. Among these is the general simplicity of the suspension system, due mainly to the fact that all the necessary freedoms are provided in one and the same elastic supporting unit. And it is also to be noted that, due to the same provisions, there are no relatively moving bearing surfaces in the system carrying any load.

It will be apparent to those skilled in the art that the principles of the present invention may be applied to a truck having all its supporting points connected to the same car body, or to a truck which supports and articulates the adjacent ends of two car bodies. We show the invention applied in both said manners.

The above and other objects and features of our invention will be apparent to those skilled in the art from a consideration of the following detailed description, taken with the accompanying drawings, in which drawings:

Fig. 1 is a side elevation, on a reduced scale, of the new articulated train;

Fig. 2 is a transverse, vertical section of a car;

Fig. 3 is a view, similar to Fig. 2, showing the car body in a banked position;

Fig. 4 is a longitudinal section of the adjacent ends of two cars, showing their common truck in side elevation;

Fig. 5 is a section, taken as indicated by the line 5—5 of Fig. 4, to show the truck in plan;

Fig. 6 is an enlarged horizontal section through the draw-bar connection with the truck frame;

Fig. 7 is a detail view showing the draw-bar connection with the car body;

Fig. 8 is an enlarged fragmentary detail view showing, in transverse, vertical section, the connections between the wheel unit and the car body;

Fig. 9 is an enlarged fragmentary detail view showing the manner of mounting an axle frame on its associated axle;

Fig. 10 is an enlarged fragmentary view showing the action of the supporting springs when the wheel unit or the car body pivots on rounding a curve.

Figure 11:
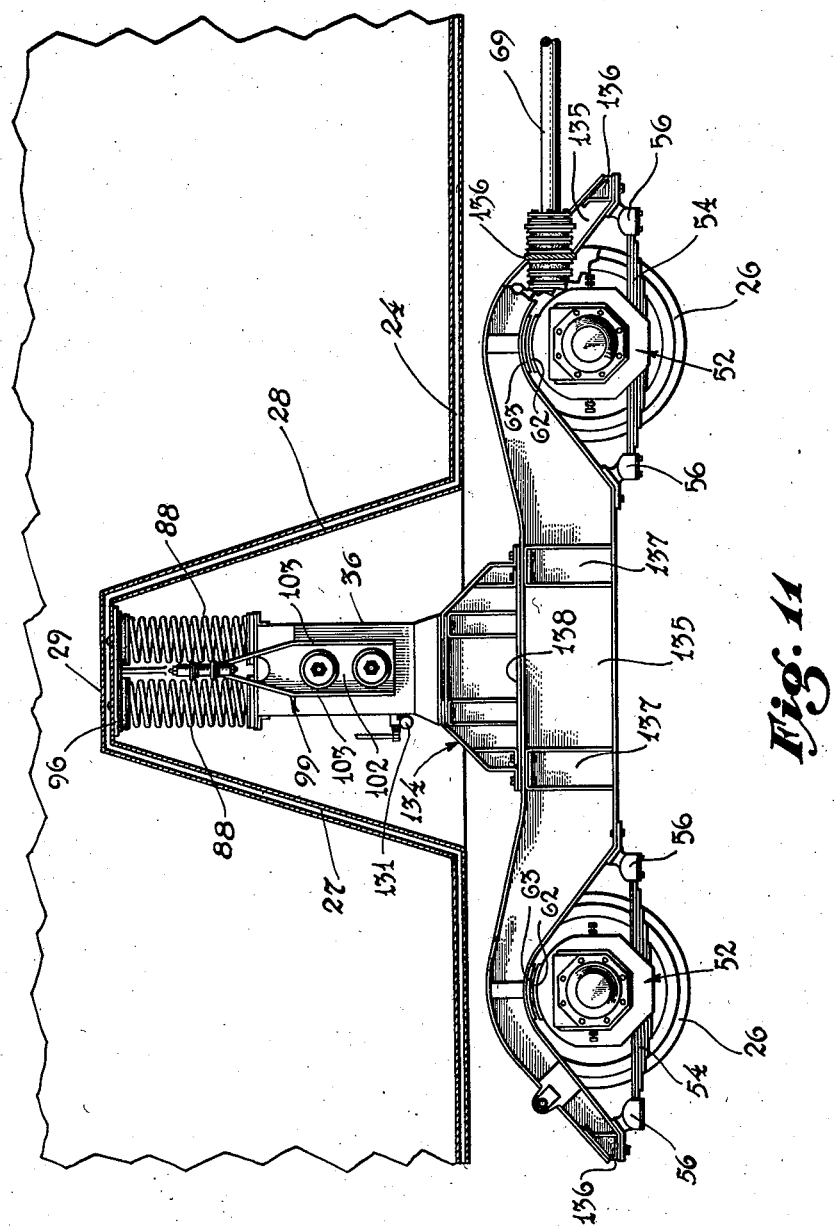
Fig. 11 is a longitudinal, sectional view, similar to Fig. 4, showing the principles of our construction as applied to a single, four-wheel end or trailing truck.

In the following specification and claims, where the term "substantial movement" is used in connection with the supporting means, it is meant to denote movement of such magnitude as will permit all relative lateral, vertical, longitudinal, and angular movements between the car body and the truck frame required for normal railroad service. The elastic supporting members between the car body and the truck frame—being the sole supporting means for the body—are of such a character as to permit, in and of themselves, through elastic flexure, duplication of all the relative movements provided by a standard swinging-bolster bogie truck in normal railroad service.

Fig. 1 shows an articulated train of cars 20, in which adjacent cars share a common truck 21. It is contemplated that the cars will be constructed entirely of metal and in accordance with the copending application, Serial Number 228,311, filed by Eliot F. Stoner, Sept. 3, 1938, in which construction each car body 22 comprises a self-supporting shell 23 having a floor 24.

At each end of the car body is a pair of truck compartments 25, there being a compartment provided above each wheel 26 of the truck 21. Each of the truck compartments 25 has inclined walls 27 and 28, fore and aft, and a top wall 29 well above the level of the center of gravity of the car body, that is indicated on the drawings as c. g. The shell 23 provides the outer walls of the compartments, while the inner walls are provided by wall members 32 that serve not only as walls for the end passages 33 of the car, but also as structural members extending to the roof of the car, acting in combination with walls 27 and 28, to distribute loading into shell 23. These passage walls may be interconnected by an upper horizontal wall 34 to provide further lateral strength. By employing such a construction, we may support the car body by means engaging the walls of the truck compartments 25.

Each truck 21 comprises two separable axle units, generally designated by letter A, each of the axle units serving, in effect, as a cradle for supporting the end of its associated car body. In our preferred construction disclosed herein, each axle unit A includes a lower, substantially horizontal frame, generally designated by numeral 35, and, integral therewith, two columns 36 extending upward into corresponding truck compartments 25 to support the car body. To combine lightness with strength, we prefer to fabricate the axle unit from sheet metal, as indicated by the drawings.

Each of the lower frames 35 includes side members 37 of hollow construction that are interconnected by a channel-shaped cross member 38, a cross member 39 at the opposite end of the frame, and an intermediate channel-shaped cross member 40, the latter two cross members lying fore and aft of the wheels 26 of the axle unit. The frame construction shown also includes internal diagonal braces 42 and a pair of parallel, longitudinally disposed, channel-shaped beams 43 that rest on and are secured to the cross members 38, 39, and 40. Each of the side members 37 is formed with an upwardly offset portion 44 associated with the corresponding wheel 26. As may be understood by referring to Fig. 9, the top wall 45 of each side frame member 37 is extended laterally to provide a base on which the column 36 is mounted at the top of the offset portion 44 of the frame member. At the inner edge of top wall 45 a depending reinforcing skirt 46 is provided, the frame member 37, wall 45, and skirt 46 thus forming a hood extending over the associated wheel 26.

Each pair of wheels 26 is integral with a common axle 47, the opposite ends of which are journaled, in this instance, in ball-bearings 48. The bearings at each end of the axle are housed by a suitable journal box 49, the cover 50 of which is removably secured by cap screws 51. Each journal box 49 is surrounded by an independent journal frame 52 having an integral stirrup 53 through which extends a leaf spring 54, U-shaped clips 55 being employed to secure the spring to the frame 52. Leaf springs 54, on each side of the axle unit, span the offset portions 44 of the corresponding side frame members 37 and may be attached to the side frame members in any suitable manner. In the construction we prefer, each frame member 37 carries rubber-lined concave bearing members 56 (Fig. 4) to receive complementary convex members 57 on each end of each leaf spring.

As means to yieldingly relate the frame 52 to the journal box 49, the top of the journal box may provide a seat 58 (Fig. 9) for an interposed layer 59 of rubber or other resilient material. Such construction permits slight lateral or oscillatory movement of the wheels and axle relative to the axle frame, and serves as shock-absorbing means. To cushion any impact of the journal frame 52 against the overhanging offset portion of the frame member 37, the journal frame may seat a pair of arcuate buffer members 62 of rubber or similar material. Extreme movement of the journal box towards the corresponding frame member 37 brings the buffer members 62 into contact with a complementary arcuate rubber plate 63 mounted on the under side of the frame member.

Normally, the two adjacent horizontal frames 35 of the axle units of adjacent cars are rigidly secured together to provide a unitary frame for a truck 21 shared by the two cars. For example, bolts 65 may extend through clips 66 at the opposed ends of beams 43, or automatic coupling means (not shown) may be employed to interconnect the ends of frame members 37 of the two frames. It will be apparent that when two axle units are so interjoined, the resulting truck is a stable construction that will maintain the four columns 36 in a rigid, vertical position.

When the two axle units are separated, to act independently instead of together as a four-wheel truck, some means must be provided to keep the axle units in proper alignment with the car body. For such purpose small auxiliary wheels 67 may be mounted on the horizontal frame 35 by pivoted arms 68. Normally these wheels are maintained in retracted position, as indicated by the drawings, but whenever the trucks are divided into separate axle units, the wheels are swung downward to engage the rails of the track. Any of the suitable means well known to the art for controlling such auxiliary wheels may be employed. It will be evident that these auxiliary wheels are not needed to support any portion of the load imposed by the car body, but serve solely as guide wheels.

Each axle unit is connected to its associated car by a longitudinally disposed draft member, preferably a draft member having a yielding action. A suggested construction is shown in the drawings, particularly in Fig. 6. The draw bar 69 has a reduced end 70 that extends through an oversized aperture in a heavy transverse plate 72 that extends between the two beams 43 of the axle unit. The aperture through plate 72 accommodates a suitable rubber collar or spacer ring 73 embracing the reduced end 70 of the draw bar. On either side of the transverse plate 72 the reduced end 70 is embraced by a pair of resilient rings 74 of rubber or other suitable material. To restrain the rings from bulging outwardly under excessive pressure, we provide each of the rings with a pair of metal disks 75 having dished edges partly confining the periphery of the resilient rings.

The series of four resilient rings 74 is confined between two heavy plates 76 and 77. Plate 76 is secured in place by nut 78 and washers 79, while plate 77 is adjustably held in place by cap screws 80 extending through a plate 81 and bearing against washers 82. Plate 81 in turn rests against the annular shoulder 83 of the draw bar. This construction permits not only longitudinal movement of the draw bar, but also oscillatory movement, there being yielding resistance to either type of movement away from the normal position shown in Fig. 6. The construction also permits the draw bar 69 to rotate in its connection with the axle unit.

The other end of the draw bar may be connected to the body of the car in any suitable manner. We prefer, however, to employ the same type of yielding connection as above described. For example, as shown in Fig. 7, such a yielding engagement may be made with a suitably apertured transverse plate 85 that is secured between a pair of longitudinal beams 86 extending under the floor 24 of the car body.

Our invention is characterized by the conception of resilient, universally yielding relations at the spaced supporting points, and it will be obvious to those skilled in the art that various yielding arrangements may be employed within the scope of this broad conception. As previously noted, we prefer a certain character of flexibility or elastic flexure between the car body and the truck, preferring greater lateral freedom than longitudinal freedom and greater vertical freedom than lateral freedom, but we do not restrict ourselves to the particular character of such flexibility herein sought nor the particular relationships between the various yielding means employed. Several different forms of means may be utilized to provide the elastic flexure desired between the truck and the car body.

In our preferred construction disclosed herein, we achieve the desirably extensive freedom for relative movement in vertical aspect by simply resting the car body on vertically disposed helical springs mounted on the columns 36 of the axle unit. Preferably, the springs employed are "soft" in the sense that they are designed to have relatively great static deflection under normal load. Relatively long springs are indicated, and length is desirable, also, to permit the springs to be distorted laterally in the turning movement of the truck on curves without exceeding safe stresses in the material of the springs.

The drawings show two helical springs 88 mounted on the top wall 89 of each column 36, the springs being in compression between the top of the column and the top wall 29 of the corresponding truck compartment. A lower resilient seat for each spring is provided by an assembly comprising a resilient pad 90 in the form of a ring made of rubber or like material, and two retaining members for the pad, a flanged metal ring 91 and a flanged disk 92, the assembly being secured to wall 89 by a suitable bolt 93. A similar resilient seat, generally indicated by numeral 94, is shown for the upper end of springs 88 and is secured to the compartment wall 29 by a suitable bolt 95. Since in this arrangement the weight of the car body is supported by the top wall 29 and the truck compartment, a reenforcement plate 96 may be interposed between the supporting springs and the compartment wall 29, the plate having a vertical portion 97 secured to the vertical wall 32.

Springs 88 in the particular form here illustrated used only with the elements thus far described would be structurally unstable. The addition of laterally acting, yielding means effective between the columns 36 and the car body, however, results in a stable combination in which the vertical and lateral yielding means in normal equilibrium cooperate to hold the car body in normal alignment with its associated wheel unit. One arrangement that may be employed to provide the required laterally acting, yielding means is shown in the drawings, but other means attaining the same end will readily occur to those skilled in this art. In fact, the desired lateral restraint may be accomplished by utilizing the elastic properties of the supporting springs and their positioning, but, in order to obtain the greatest degree of flexibility in the supporting springs, it is desirable to keep separate the functions of vertical support and lateral restraint by the use of auxiliary restraining means.

The preferred construction includes an arm 99 yieldingly mounted on the outer wall 100 of each column 36 and a tension member, or link, 101 connected by universal joints with the end of the arm and with the wall 32 of the car body. An arm of the required characteristics may have a central web 102 and marginal ribs 103 that extend above the uppermost edge of the web and converge to form an end portion 104. Each arm is mounted to the wall 100 by means of spaced bolts 105 extending through oversized apertures 106 in the web 102 of the arm, the apertures being oversized to permit oscillation of the arm. Embracing the bolts 105 between the wall 100 and the web 102, is a circular cushion 107 of rubber, or similar material, of sufficient thickness to hold the arm in spaced relationship to the wall 100. By preference a flanged metal washer 108 is interposed between cushion 107 and the wall 100. Also embracing each bolt 105 against the outer face of the web 102 is a similar rubber cushion 109 with a similar associated metal washer 110. Finally, at the outer end of each bolt 105 is a retaining washer 111 secured by a nut 112.

The universal joint between the arm 99 and the link 101 is provided by a socket member 113 at the end of the link, and a complementary ball member 114 integral with a bolt 115 extending upward through the end portion 104 of the arm. A suitable helical spring 118 and retaining disk 119 mounted on the bolt 115 between the end of the arm and the end of the link tend to minimize clearance or play of the ball in the socket. In similar manner the universal joint between the link 101 and the car body may be provided by a socket member 120 at the end of the link and a complementary ball member 121 on a bolt 122; the bolt extending through a lug 123 formed in the vertical portion 97 of reenforcement plate 96. Mounted on the bolt is a small helical spring 124 and a retaining disk 125 serving the same purpose as spring 118 and disk 119. Links 101 serve to restrain lateral movements of the car body at the level of their attachment and also to focus the motion of the car body about a banking axis longitudinally of the car and above the center of gravity, as indicated at b. a. in Fig. 2. Furthermore, as will be explained, they tend to localize the vertical swivelling axis at a central point between them and between the elastic supporting columns, and to restrain and restore the swinging and swivelling movements.

While in this instance it is preferable to mount the arms 99 and connect links 101, as shown in Figs. 2 and 8, to cause the car to bank about an axis above its center of gravity, it is to be understood that for certain purposes arms 99 may be so mounted as to connect links 101 to the car body at other points, either above or below springs 88.

In addition to the cushioned arms 99 and links 101, adjustable shock-absorbing and cushioning means may be provided to check or retard the banking movements of the body relative to the wheel unit frame. Such means may consist of shock-absorbing elements 126, of any of the well-known types, mounted on plates 127 secured to the top faces 128 of the columns 36 and connected through the medium of arms 129 and links 130 to the upper ends of arms 99. Similar means may also be provided to cushion or check the vertical oscillations of the wheel unit frame relative to the body. Shock-absorbing elements 131 may be secured to side walls of columns 36 and connected by arms 132 and links 133 to top walls 29. These checks act vertically in parallel with springs 88 and prevent objectionable body oscillation on these springs at resonant frequency. They also check the swinging oscillation of the body. Similar means may also be provided for springs 54.

In Fig. 11 is shown the application of the principles of our construction to a single, four-wheel trailing truck, such as may be used at the ends of the first and last cars. Like parts are given like numbers as those heretofore described. Columns 36 are supported upon base plates 134, which are, in turn, supported upon side frame members 135. The plates 134 and side frame members 135 are preferably fabricated from sheet steel and may be joined and suitably braced by the usual cross frame members 136, 137, and 138. The wheel axles may be journaled in suitable bearings and the frame members 135 supported thereon by springs 54 as hereinbefore described. The draw bar 69 may be connected to the truck frame in the manner illustrated in Fig. 6, through the medium of a transverse plate 136 supported between the side frame members 135.

It is important that the functions of the two arms 99 and the associated links 101 be understood, especially in the aspect of yielding means cooperating with the load-bearing springs 88. In normal straight-line travel, the laterally-acting yielding means hold the car body centrally on the load-bearing springs, and, at the same time, act as a cushioning means for fleeting, laterally-directed forces between the car body and its associated axle units. And they act at all times yieldingly to restrain lateral movement of the body at their level and thereby to force the body to swing pendulously about the axis $b.\,a.$ at or near that level. When the car turns a curve at sufficient speed to cause the body to swing, as heretofore described, the links 101 are thrown out of normal co-axial alignment both by the swinging action of the car body, as indicated in Fig. 3, and by the rotation of the truck, as indicated by Fig. 10. Such departure from normal alignment of the links is resisted by the compression of the upper rubber pad 107 and the lower rubber pad 109 associated with each arm 99, as may be understood by reference to Fig. 3. This action exerts increasing opposed tensions between the pivoted ends of the links. As a result of the increased tension of the links 101 and increased compression of the rubber pads, the swinging of the car body is resisted to some extent and a desirable degree of restraint is also presented to the swivelling movements of the truck out of normal alignment. This construction has the function of restricting the swivelling movements of each wheel unit, or of each car with respect to a wheel unit, to a close approximation to rotation about a vertical axis centrally of the wheel unit and of the supporting unit.

We have, in effect, a three-point connection between the car body and the axle unit, in which are incorporated diversely disposed yielding means cooperating to take care of all relative movement between the car body and the axle unit in a manner conducive of maximum stability and riding comfort. The yielding connections between the columns 36 of the axle unit and the car body are not operative through elastic flexure to restrain to the required extent relative movement of the car body longitudinally. But restraint is provided, however, by the draw bar 69 associated with each axle unit without interfering with universality of the yielding action at the elevated support points, within the limits of motion required in railroad service. It is important to note, as features and objects of our invention, that the desirably restrained character of the yielding action through the draft bars does not conflict with the required universal freedom at the support points, because the draft bar is connected to the axle unit near the central, vertical axis of the wheel and supporting units, and that such draft connection acting at the lower level cooperates with the links acting at the higher level to fix that axis, whereby the components of relative movement at one laterally spaced support point, considered with respect to a horizontal plane, are balanced by similar and opposite components of movement at the other support point. All the longitudinal draft forces, positive and negative, are transmitted between the truck or wheel unit and the car body exclusively at the low level of the truck and without interfering at all with the desired actions of the supporting and controlling units. Those units are entirely free from the effects of draft force transmission.

A virtue of this particular method of floating a car body on its wheel unit is that we obtain the well-known advantages of employing "soft" supporting springs but avoid the undesirable type of rolling or swaying that inevitably results from using relatively long, soft springs in the conventional body suspensions of the prior art.

Forces acting between the car body and the axle unit that are predominantly vertical are resisted by the load-bearing springs 88 in a manner conducive to the comfort of the passengers, the smaller, more fleeting forces being dissipated, the larger and more enduring forces being accommodated by smooth transitions of the car body. An advantage peculiar to this type of floating suspension is the manner in which the car negotiates a curve at high speed. The centrifugal force occasioned by the change in direction being exerted laterally on the center of gravity of the car below the points of support causes the car to swing outwardly at the bottom, or, in effect, to lean inwardly at the top, as indicated by Fig. 3. Simultaneously, the curve in the track rotates the trucks associated with the car body out of a normal alignment with the body. The load-bearing springs are readily distorted to permit this turning movement without losing their ability to support the load of the car body.

While our disclosure has been of a detailed and specific nature, it is to be understood that the principles are broadly applicable to various types of vehicles, and it will be recognized by those skilled in the art that a wide range of substitutes and alterations may be made without departing from the spirit of our invention. We reserve the right to all such changes and substitutions within the purview of our appended claims.

The claims of this application are directed to the subject matter herein described having to do with the suspension and controls regardless of whether or not there is articulation of adjacent car bodies through the trucks. The articulation features are the subject matter of a co-pending application Ser. No. 316,070, filed January 29, 1940.

Having described our invention, we claim:

1. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns.

2. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, and means for restraining relative longitudinal movement between the body and wheel unit, said means embodying a connective member interconnecting the body and wheel unit substantially at the level of the wheel unit.

3. In combination with a vehicle body and wheel unit; an elastically flexible body supporting unit comprising a pair of universally elastic columns spaced laterally and symmetrically with reference to the longitudinal center line of the body, having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, said columns being mounted directly on a rigid part of the wheel unit and forming the sole flexible support of the body on the wheel unit.

4. In combination with a vehicle body and wheel unit; an elastically flexible body supporting unit comprising a pair of universally elastic columns spaced laterally and symmetrically with reference to the longitudinal center line of the body, having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, and means limiting relative longitudinal movement between the body and the wheel unit but allowing all other relative movements between the body and wheel unit.

5. In combination with a vehicle body and wheel unit; an elastically flexible body supporting unit comprising a pair of universally elastic columns spaced laterally and symmetrically with reference to the longitudinal center line of the body, having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, and means limiting relative longitudinal movement between the body and the wheel unit, said means including a draw bar pivotally connected with the body and pivotally connected with the wheel unit at a point near a vertical axis centrally located between the pair of elastic columns.

6. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns; and means for restraining lateral movements of the body with respect to the wheel unit and for localizing a longitudinal center of oscillation, said means being connected between the wheel unit and body and applying yielding lateral restoring forces to the body in substantially transverse horizontal and opposite directions at a level above its substantial center of gravity.

7. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having, within its vertical length between its wheel unit support and its body engagement, elastic flexibilities vertically, transversely and torsionally about a vertical axis, and being substantially unconfined as regards corresponding flexures, so as to allow the body corresponding elastically opposed freedoms with respect to the wheel unit by virtue substantially solely of said elastic flexures.

8. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having universal elastic flexibilities within its length between its wheel unit support and its body engagement, and being substantially unconfined as regards universal flexures, so as to allow the body corresponding elastically opposed universal freedom with respect to the wheel unit by virtue substantially solely of said elastic flexures.

9. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having universal elastic flexibilities within its length between its wheel unit support and its body engagement, and being substantially unconfined as regards universal flexures, so as to allow the body corresponding elastically opposed universal freedom with respect to the wheel unit by virtue substantially solely of said elastic flexures; and means for restraining relative longitudinal movement between the body and the wheel unit but allowing all other relative movement therebetween, said means embodying a connective member interconnecting the body and wheel unit substantially at the level of the wheel unit.

10. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having, within its vertical length between its wheel unit support and its body engagement, elastic flexibilities vertically, transversely and torsionally about a vertical axis, and being substantially unconfined as regards corresponding flexures, so as to allow the body corresponding elastically opposed freedoms with respect to the wheel unit by virtue substantially solely of said elastic flexures; and means for restraining lateral movements of the body with respect to the wheel unit and for localizing a longitudinal center of oscillation, said means being connected between the wheel unit and body and applying yielding lateral restoring forces to the body in substantially transverse horizontal and opposite directions at a level above its substantial center of gravity.

11. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having universal elastic flexibilities within its length between its wheel unit support and its body engagement, and being substantially unconfined as regards universal flexures, so as to allow the body corresponding elastically opposed universal freedoms with respect to the wheel unit by virtue substantially solely of said elastic flexures; and means for restraining lateral movements of the body with respect to the wheel unit and for localizing a longitudinal center of oscillation, said means being connected between the wheel unit and body and applying yielding lateral restoring forces to the body in substantially transverse horizontal and opposite directions at a level above its substantial center of gravity.

12. In combination with a vehicle body and wheel unit; an upward extension on the wheel unit, a body supporting unit including an upwardly extending columnar spring supported at its lower end by the wheel unit extension and supportingly engaging a rigid part of the body at its upper end at a level above the substantial center of gravity of the body, said columnar spring being universally elastically flexible within its length and being substantially unconfined so as to allow the body corresponding elastically opposed freedoms by virtue substantially solely of the elastic flexures of the columnar spring.

13. In combination with a vehicle body and wheel unit; a pair of laterally spaced upward extensions on the wheel unit, a pair of universally elastic columnar springs spaced laterally and symmetrically with reference to the longitudinal center line of the body, said columnar springs supported at their lower ends on the extensions, extending upwardly, and supportingly engaging a rigid part of the body at their upper ends at a level above the substantial center of gravity of the body, said columnar springs being substantially unconfined as regards universal flexures, so as to allow the body substantially universal and elastically opposed freedoms by virtue of the elastic flexures of the columnar springs.

14. In combination with a vehicle body and wheel unit; an upward extension on the wheel unit, a body supporting unit including an upwardly extending columnar spring supported at its lower end on the wheel unit extension and supportingly engaging a rigid part of the body at its upper end at a level above the substantial center of gravity of the body, said columnar spring being universally elastically flexible within its length and being substantially unconfined so as to allow the body corresponding elastically opposed freedoms by virtue substantially solely of the elastic flexures of the columnar spring; and means for restraining lateral movements of the body with respect to the wheel unit and for localizing a longitudinal center of oscillation, said means being connected between the wheel unit and body and applying yielding lateral restoring forces to the body in substantially transverse horizontal and opposite directions at a level above its substantial center of gravity.

15. In combination with a vehicle body and wheel unit; a pair of laterally spaced upward extensions on the wheel unit, a pair of universally elastic columnar springs spaced laterally and symmetrically with reference to the longitudinal center line of the body, said columnar springs supported at their lower ends on the extensions, extending upwardly, and supportingly engaging a rigid part of the body at their upper ends at a level above the substantial center of gravity of the body, said columnar springs being substantially unconfined as regards universal flexures so as to allow the body substantially universal and elastically opposed freedoms by virtue of the elastic flexures of the columnar springs; and means for restraining lateral movements of the body with respect to the wheel unit and for localizing a longitudinal center of oscillation, said means being connected between the wheel unit and body and applying yielding lateral restoring forces to the body in substantially transverse horizontal and opposite directions at a level above its substantial center of gravity.

16. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, and two independently acting movement dampers connected between the wheel unit and the body in symmetric relation at opposite sides of the longitudinal center line of the body and acting to independently damp vertical movements of the two sides of the body.

17. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having, within its vertical length between its wheel unit support and its body engagement, elastic flexibilities vertically, transversely and torsionally about a vertical axis, and being substantially unconfined as regards corresponding flexures, so as to allow the body corresponding elastically opposed freedoms with respect to the wheel unit by virtue substantially solely of said elastic flexures, and two independently acting movement dampers connected between the wheel unit and the body in symmetric relation at opposite sides of the longitudinal center line of the body and acting to independently damp vertical movements of the two sides of the body.

18. In combination with a vehicle body and wheel unit; a body supporting unit including an elastically flexible body supporting element supported by the wheel unit, extending upwardly, and supporting the body at its upper end by support engagement with a rigid part of the body at a level above its substantial center of gravity, said element having, within its vertical length between its wheel unit support and its body engagement, elastic flexibilities vertically, transversely and torsionally about a vertical axis, and being substantially unconfined as regards corresponding flexures, so as to allow the body corresponding elastically opposed freedoms with respect to the wheel unit by virtue substantially solely of said elastic flexures; means for restraining lateral movements of the body with respect to the wheel unit and for localizing a longitudinal center of oscillation, said means being connected between the wheel unit and body and applying opposed yielding lateral restoring forces to the body in substantially transverse horizontal directions at a level above its substantial center of gravity, and two independently acting movement dampers connected between the wheel unit and the body in symmetric relation at opposite sides of the longitudinal center line of the body and acting to independently damp vertical movements of the two sides of the body.

19. In combination with a vehicle body and wheel unit; a body supporting unit including an elastically flexible body supporting element supported by the wheel unit, extending upwardly and supportingly engaging the body at its upper end, said element having universal elastic flexibilities within its length between its wheel unit support and its body engagement, and being substantially unconfined as regards universal flexures, so as to allow the body corresponding elastically opposed universal freedom with respect to the wheel unit by virtue substantially solely of said elastic flexures; means for restraining lateral movements of the body with respect to the wheel unit and for localizing a longitudinal center of oscillation, said means being connected between the wheel unit and body and applying yielding lateral restoring forces to the body in substantially horizontal and opposite directions at a level above its substantial center of gravity; and means limiting relative longitudinal movement between the body and the wheel unit but allowing all other relative movements between them.

20. In combination with a vehicle body and wheel unit; a body supporting unit including an elastically flexible body supporting element supported by the wheel unit, extending upwardly and supportingly engaging the body at its upper end, said element having universal elastic flexibilities within its length between its wheel unit support and its body engagement, and being substantially unconfined as regards universal flexures, so as to allow the body corresponding elastically opposed universal freedom with respect to the wheel unit by virtue substantially solely of said elastic flexures; means for restraining lateral movements of the body with respect to the wheel unit and for localizing a longitudinal center of oscillation, said means being connected between the wheel unit and body and applying yielding lateral re-restoring forces to the body in substantially horizontal and opposite directions at a level above its substantial center of gravity; and means limiting relative longitudinal movement between the body and the wheel unit but allowing all other relative movements between them, said means embodying a connective member interconnecting the body and wheel unit substantially at the level of the wheel unit and below the level of support engagement of the body.

21. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit, extending upwardly and supportingly engaging the body at their upper ends, both columns having universal elastic flexibilities within their lengths between their wheel unit support and their body engagement, and both columns being substantially unconfined against universal flexure so as to allow the body substantially universal freedom with respect to the wheel unit by virtue of elastic universal flexure of the columns; means for restraining lateral movements of the body with respect to the wheel unit and for localizing a longitudinal center of oscillation, said means being connected between the wheel unit and body and applying yielding lateral restoring forces to the body in substantially horizontal and opposite directions at a level above its substantial center of gravity; and means limiting relative longitudinal movement between the body and the wheel unit but allowing all other relative movements between them.

22. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit, extending upwardly and supportingly engaging the body at their upper ends, both columns having universal elastic flexibilities within their lengths between their wheel unit support and their body engagement, and both columns being substantially unconfined against universal flexure so as to allow the body substantially universal freedom with respect to the wheel unit by virtue of elastic universal flexure of the columns; means for restraining lateral movements of the body with respect to the wheel unit and for localizing a longitudinal center of oscillation, said means being connected between the wheel unit and body and applying yielding lateral restoring forces to the body in substantially horizontal and opposite directions at a level above its substantial center of gravity; and means limiting relative longitudinal movement between the body and the wheel unit but allowing all other relative movements between them, said means embodying a connective member interconnecting the body and wheel unit substantially at the level of the wheel unit and below the level of support engagement of the body.

23. In combination with a vehicle body and wheel unit; an elastically flexible body supporting unit supported on the wheel unit and flexibly supporting the body with freedom for rotative oscillation about a longitudinal center above its substantial center of gravity, said elastic supporting unit having elastic flexibility vertically, transversely and torsionally about a vertical axis, and being substantially unconfined as regards corresponding flexures so as to allow the body corresponding freedoms with respect to the wheel unit by virtue of said elastic flexures, and means for controlling lateral movement of the body with respect to the wheel unit, for localizing the longitudinal center of oscillation and for localizing a vertical central swivelling axis for the wheel unit with respect to the body, said means embodying two substantially horizontally extending yielding tension links respectively having one end universally connected with the body at points located in laterally horizontally spaced symmetry at opposite sides of the intersection of the oscillation and swivelling centers, said links extending oppositely from said connection points and universally connected to the wheel unit at their other ends, and exerting tension forces on the body in opposite directions at said body connection points.

24. In combination with a vehicle body and wheel unit; an elastically universally flexible body supporting unit supported on the wheel unit and flexibly supporting the body by support engagement with a rigid part of the body at a level above its substantial center of gravity, said elastic supporting unit being substantially unconfined against universal flexure so as to allow the body universal freedom with respect to the wheel unit by virtue of its elastic flexures, and means for controlling lateral movement of the body with respect to the wheel unit, for localizing the longitudinal center of oscillation and for localizing a vertical central swivelling axis for the wheel unit with respect to the body, said means embodying two substantially horizontally extending yielding tension links respectively having one end universally connected with the body at points located in laterally horizontally spaced symmetry at opposite sides of the intersection of the oscillation and swivelling centers, said links extending oppositely from said connection points and universally connected to the wheel unit at their other ends, and exerting tension forces on the body in opposite directions at said body connection points; and means limiting relative longitudinal movement between the body and the wheel unit but allowing all other relative movements between them, said means embodying a connective member interconnecting the body and wheel unit substantially at the level of the wheel unit and below the level of support engagement of the body.

25. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit and flexibly supporting the body with freedom for rotative oscillation about a longitudinal center above the substantial center of gravity of the body, each of said columns being substantially unconfined against universal flexure so as to allow the body substantially universal freedom with respect to the wheel unit by virtue of elastic universal flexure of the columns, and means for controlling lateral movement of the body with respect to the wheel unit, for localizing the longitudinal center of oscillation and for restraining oscillation, said means embodying two substantially horizontally extending linkages respectively having one end pivotally connected with the body at points located in laterally horizontally spaced symmetry at opposite sides of the oscillation center, said linkages extending oppositely from said connection points and having their other ends pivotally connected to the wheel unit, and means associated with the respective linkages exerting opposing tension forces between their ends.

26. In combination with a vehicle body and wheel unit; a pair of rigid pedestals rigidly mounted on the wheel unit at opposite sides of and in symmetrical relation to the center line of the body and extending upwardly into the body, an elastically flexible body supporting unit comprising a pair of universally elastic columns spaced laterally and symmetrically with reference to the longitudinal center line of the body, having their lower ends supported by said pedestals and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, and means for controlling relative movements between the body and the wheel unit, said means including two links pivotally connected, respectively, to the body at points spaced at opposite sides of the body center and at a level above the substantial center of gravity of the body, said links extending transversely oppositely from their respective pivotal connections, and means carried by the two pedestals and exerting opposite restoring forces on the two ends of the two links to resist their movement.

27. In combination with a vehicle body and wheel unit; a pair of rigid pedestals rigidly mounted on the wheel unit at opposite sides of and in symmetrical relation to the center line of the body and extending upwardly into the body, an elastically flexible body supporting unit comprising a pair of universally elastic columns spaced laterally and symmetrically with reference to the longitudinal center line of the body, having their lower ends supported by said pedestals and their upper ends supportingly engaging a rigid part of the body at a level above the substantial center of gravity of the body, each of said columns being substantially unconfined against universal flexure so as to allow the body substantially universal freedom with respect to the wheel unit by virtue of elastic universal flexure of the columns, means for controlling relative movements between the body and the wheel unit, said means including two links pivotally connected, respectively, to the body at points spaced at opposite sides of the body center and at a level above the substantial center of gravity of the body, said links extending transversely oppositely from their respective pivotal connections, and means carried by the two pedestals and exerting opposite restoring forces on the ends of the two links to resist their movements, and means for restraining relative longitudinal movement between the body and wheel unit, said means embodying a connective member interconnecting the body and wheel unit substantially at the level of the latter.

28. In combination with a vehicle body and wheel unit; a flexible body supporting unit supported on the wheel unit and flexibly supporting the body with freedom for rotative oscillation about a longitudinal axis above its substantial center of gravity and for swivelling about a central vertical axis; and means for restraining lateral movement of the body with respect to the wheel unit, for localizing the longitudinal axis of oscillation and the vertical axis of swivelling, and for restraining rotative movements of the body about said axes, said means including two elements normally disposed substantially in a horizontal transverse line determined by the intersection of the two axes and symmetrically oppositely with reference to said intersection, each of said elements embodying a linkage universally pivotally connected between a point on the body eccentric of said axis intersection and a point on the wheel unit also eccentric of said axis intersection and radially spaced from said point on the body, and means associated with the linkage adapted to exert tension between said points of connection.

29. In combination with a vehicle body and wheel unit; a flexible body supporting unit supported on the wheel unit and flexibly supporting the body with freedom for rotative oscillation about a longitudinal axis above its substantial center of gravity and for swivelling about a central vertical axis; and means for restraining lateral movement of the body with respect to the wheel unit, for localizing the longitudinal axis of oscillation and the vertical axis of swivelling, and for restraining rotative movements of the body about said axes, said means including two elements normally disposed substantially in a horizontal transverse line determined by the intersection of the two axes and symmetrically oppositely with reference to said intersection, each of said elements embodying a linkage universally pivotally connected between a point on the body eccentric of said axis intersection and a point on the wheel unit also eccentric of said axis intersection and radially spaced from said point on the body, and means associated with the linkage adapted to exert tension between said points of connection; and means limiting relative longitudinal movement between the body and the wheel unit but allowing all other relative movements between the body and wheel unit.

30. In combination with a vehicle body and wheel unit; a pair of walled compartments spaced laterally and symmetrically with reference to the longitudinal center line of the body and each having fore and aft and lateral walls structurally integrated with the body and forming a part of its weight carrying structure, a pair of rigid pedestals mounted on the wheel unit in lateral spacing symmetric with reference to the center line of the body and extending upwardly each into one of the compartments, a pair of universally elastic supporting columns mounted on the two pedestals in symmetric relation to the body center line and extending upwardly in said compartments and having their upper ends supportingly connected with the compartment walls at a level above the substantial center of gravity of the body, said compartments being of such size in plan-section as to clear the pedestals and columns so as to allow the body substantially universal freedom with respect to the wheel unit by virtue of elastic universal flexures of the columns.

31. In combination with a vehicle body and wheel unit; a pair of walled compartments spaced laterally and symmetrically with reference to the longitudinal center line of the body and each having fore and aft and lateral walls structurally integrated with the body and forming a part of its weight carrying structure, a pair of rigid pedestals mounted on the wheel unit in lateral spacing symmetric with reference to the center line of the body and extending upwardly each into one of the compartments, a pair of universally elastic supporting columns mounted on the two pedestals in symmetric relation to the body center line and extending upwardly in said compartments and having their upper ends supportingly connected with the compartment walls at a level above the substantial center of gravity of the body, said compartments being of such size in plan-section as to clear the pedestals and columns so as to allow the body substantially universal freedom with respect to the wheel unit by virtue of elastic universal flexures of the columns, and means acting between the pedestals and the compartment wall structures at a level above the substantial center of gravity of the body to restrain lateral movements of the body at that level.

32. In combination with a vehicle body and wheel unit; an elastically flexible body supporting unit comprising a pair of universally elastic columns spaced laterally and symmetrically with reference to the longitudinal center line of the body, said columns having their lower ends supported by the wheel unit and flexibly supporting the body with freedom for rotative oscillation about a longitudinal center above the substantial center of gravity of the body, each of said columns being substantially unconfined against universal flexure so as to allow the body substantially universal freedom with respect to the wheel unit by virtue of elastic universal flexure of the columns, and means for controlling lateral movement of the body with respect to the wheel unit, for localizing the longitudinal center of oscillation and for restraining oscillation, said means embodying two substantially horizontally extending linkages respectively having one end pivotally connected with the body at points located in laterally horizontally spaced symmetry at opposite sides of the oscillation center, said linkages extending oppositely from said connection points and having their other ends pivotally connected to the wheel unit, means associated with the respective linkages exerting opposing tension forces between their ends, and two independently acting movement dampers connected between the wheel unit and the body in symmetric relation at opposite sides of the longitudinal center line of the body and acting to independently damp vertical movements of the two sides of the body.

WILLIAM E. VAN DORN.
PAUL K. BEEMER.